United States Patent
Bevis et al.

(10) Patent No.: US 7,423,264 B2
(45) Date of Patent: Sep. 9, 2008

(54) ATOMIC FORCE MICROSCOPE

(75) Inventors: Christopher F. Bevis, Los Gatos, CA (US); Marco Tortonese, Mountain View, CA (US)

(73) Assignee: KLA-Tencor Technologies Corporation, Milpitas, CA (US)

( * ) Notice: Subject to any disclaimer, the term of this patent is extended or adjusted under 35 U.S.C. 154(b) by 74 days.

(21) Appl. No.: 11/518,320

(22) Filed: Sep. 8, 2006

(65) Prior Publication Data

US 2008/0060426 A1    Mar. 13, 2008

(51) Int. Cl.
    *G01B 11/02*    (2006.01)
    *G01B 11/04*    (2006.01)
    *H01J 37/252*    (2006.01)

(52) U.S. Cl. .................. 250/306; 250/307; 250/442.11; 73/104; 73/105

(58) Field of Classification Search ................. 250/306, 250/307, 440.11, 442.11; 73/105, 104, 718, 73/722, 724, 728, 735, 774, 780
See application file for complete search history.

(56) References Cited

U.S. PATENT DOCUMENTS

| | | | |
|---|---|---|---|
| 4,800,274 A | 1/1989 | Hamsa | |
| 4,902,892 A | 2/1990 | Okayama | |
| 5,047,633 A | 9/1991 | Finlan | |
| 5,092,163 A | 3/1992 | Young | |
| 5,162,653 A | 11/1992 | Hosaka | |
| 5,298,975 A * | 3/1994 | Khoury et al. | 356/624 |
| 5,345,816 A | 9/1994 | Clabes | |
| 5,595,942 A | 1/1997 | Albrecht | |
| 5,750,989 A * | 5/1998 | Lindsay et al. | 250/306 |
| 5,763,767 A * | 6/1998 | Jung et al. | 73/105 |
| 5,952,657 A | 9/1999 | Alexander | |
| 6,530,268 B2 * | 3/2003 | Massie | 73/105 |
| 6,612,160 B2 * | 9/2003 | Massie et al. | 73/105 |
| 2002/0124636 A1 * | 9/2002 | Massie et al. | 73/105 |
| 2002/0125415 A1 * | 9/2002 | Massie | 250/234 |
| 2003/0160170 A1 * | 8/2003 | McMaster et al. | 250/306 |
| 2003/0209060 A1 * | 11/2003 | Proksch | 73/105 |
| 2004/0079142 A1 * | 4/2004 | Proksch | 73/105 |
| 2007/0158552 A1 * | 7/2007 | Kim et al. | 250/306 |
| 2007/0215804 A1 * | 9/2007 | Suzuki et al. | 250/311 |
| 2008/0060426 A1 * | 3/2008 | Bevis et al. | 73/105 |
| 2008/0061230 A1 * | 3/2008 | Wang et al. | 250/306 |

\* cited by examiner

*Primary Examiner*—Bernard E Souw
(74) *Attorney, Agent, or Firm*—Caven & Aghevli LLC

(57) ABSTRACT

In one embodiment, an atomic force microscope comprises a frame, a beam coupled to the frame at a first end and a second end, a probe mounted to the beam, means for inducing relative motion between the beam and an underlying surface, and means for detecting a characteristic of the beam.

30 Claims, 2 Drawing Sheets

ATOMIC FORCE MICROSCOPE

BACKGROUND

The subject matter described herein relates to atomic force microscopes.

Various technology sectors such as, e.g., the semiconductor sector, need tools and techniques to perform surface inspection. Scanning tunneling microscopy (STM) and atomic force microscopy (AFM) are techniques for inspecting surfaces. In general, an electrically conductive probe is mounted on a cantilevered support, which is vibrated at the resonance frequency of the support. A detector such as, e.g., a laser heterodyne interferometer measures the amplitude of the vibration. This measurement can be used to determine the force between the probe and the surface.

BRIEF DESCRIPTION OF THE DRAWINGS

The detailed description is described with reference to the accompanying figures.

DETAILED DESCRIPTION

Described herein are exemplary embodiments of atomic force microscopes. In the following description, numerous specific details are set forth in order to provide a thorough understanding of various embodiments. However, it will be understood by those skilled in the art that the various embodiments may be practiced without the specific details. In other instances, well-known methods, procedures, components, and circuits have not been described in detail so as not to obscure the particular embodiments.

Figure 1:
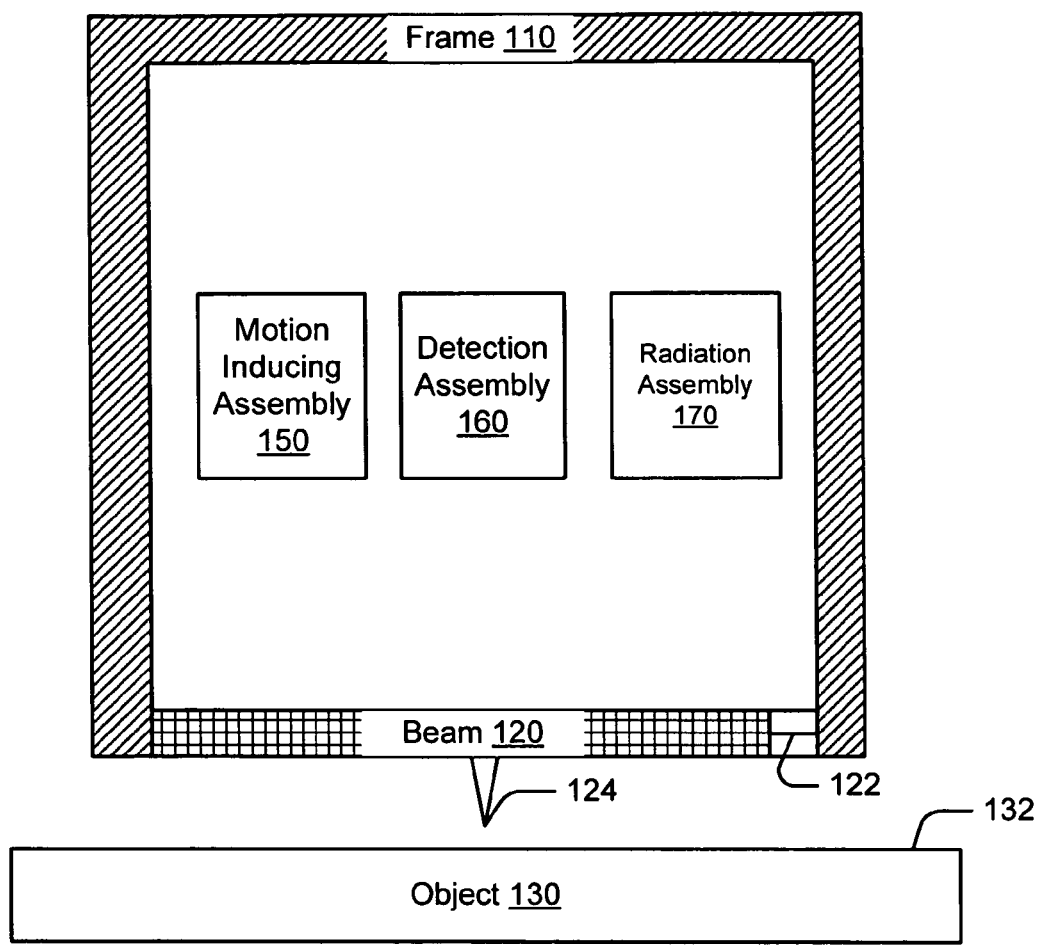
FIG. 1 is a schematic illustration of an atomic force microscope in accordance with an embodiment.

FIG. 1 is a schematic illustration of an atomic force microscope 100 for inspecting the surface 132 of an object 130 in accordance with an embodiment. Additional embodiments of atomic force microscopes are described in U.S. Pat. Nos. 5,345,815, 5,444,244, 5,483,822, 5,595,942, 5,861,624, 5,952,657, 6,005,251, and 6,646,737, the disclosures of which are incorporated by referenced herein in their entirety.

Referring to FIG. 1, atomic force microscope 100 comprises a frame 110. A beam 120 is coupled to frame 120 at each end of beam 120. In some embodiments, beam 120 may be connected directly to frame 120 by a suitable connector such as, e.g., a screw, rivet, or by soldering or welding, as illustrated on the left-hand side of beam 120. In alternate embodiments, beam 120 may be coupled to frame 110 by one or more flexures 122, as illustrated on the right-hand side of beam 120.

A sensor (or probe) 124 is coupled to beam 120 and positioned such that, in use, sensor 124 is positioned proximate to or in contact with the surface 132 of object 130. In some embodiments, sensor 124 may be tapered such that the tip of sensor 124 defines a point of interaction between sensor 124 and surface 132.

Figure 2A:
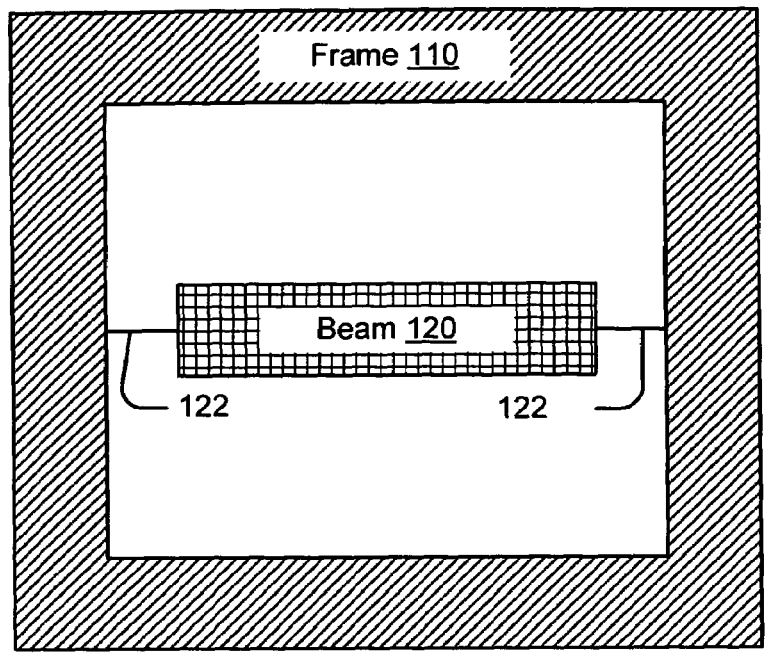
FIGS. 2A and 2B are schematic illustrations of atomic force microscopes in accordance with embodiments.
Figure 2B:
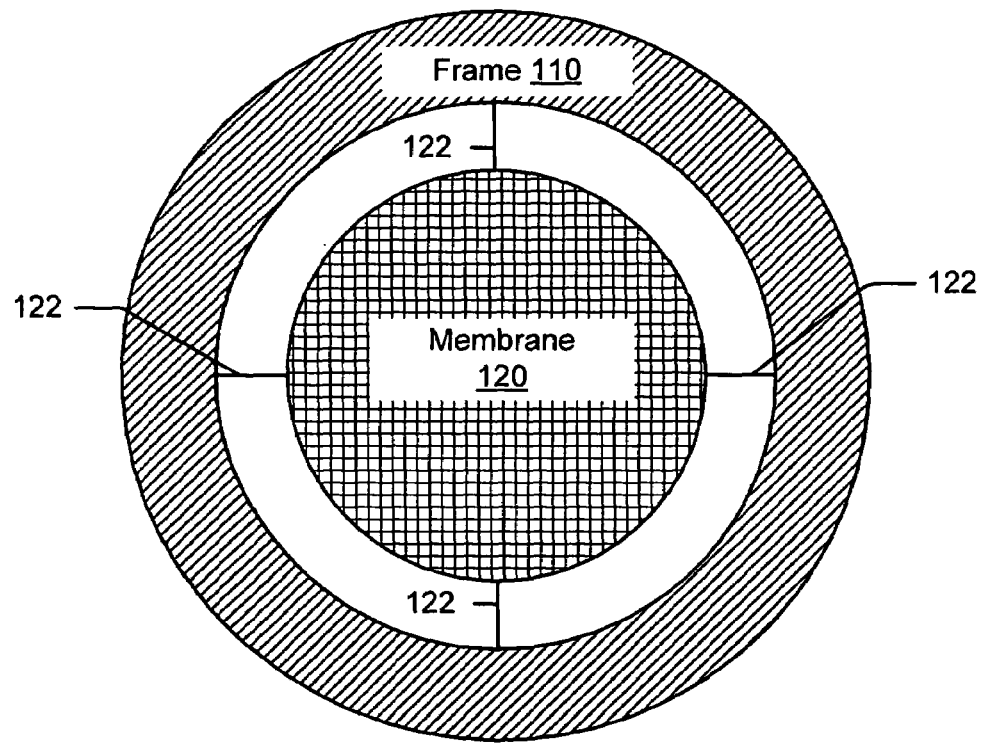

FIGS. 2A and 2B are schematic illustrations of atomic force microscopes in accordance with embodiments. FIGS. 2A and 2B are top views of atomic force microscopes that further illustrate aspects of the frame 110 and beam 120. Referring first to FIG. 2A, frame 110 may be rectangular in cross-section to provide opposing surfaces to which beam 120 may be secured. In the embodiment depicted in FIG. 2A, beam 120 is secured to opposing sides of frame 110 by flexures 122.

Referring to FIG. 2B, in an alternate embodiment frame 110 may be substantially circular in cross-section. In the embodiment depicted in FIG. 2B the beam may be embodied as a rigid membrane 120, which may be constructed from a material such as, e.g., silicon, silicon nitride, quartz, ceramic, metals, semiconductors, plastic, or the like. Membrane 120 may be coupled to frame 110 by a plurality of flexures 122, as depicted in FIG. 2B. Frame 110 may be constructed using cross-sectional geometries different from those described in FIGS. 2A and 2B.

Referring back to FIG. 1, atomic force microscope 100 comprises a motion inducing assembly 150 to induce relative motion between the beam 120 and the underlying surface 132 of object 130. In operation, motion inducing assembly 150 induces oscillation in beam 120 to thereby induce relative motion between beam 120, and hence probe 124, and the surface 132 of underlying object 130. A variety of techniques may be used to induce oscillation in beam 120. For example, motion inducing assembly 150 may be embodied as a piezoelectric stimulator assembly, an acoustic stimulator assembly, an ultrasound stimulator assembly, an electrostatic assembly, a capacitive coupling assembly, an optical assembly, or a magnetic assembly.

In some embodiments, motion inducing assembly 150 may induce harmonic oscillation of beam 120. In an embodiment in which the beam 120 is connected directly to frame 110, the beam 120 will oscillate at a resonance frequency that is characterized by the geometry of the beam 120 and the physical characteristics of the material from which the beam 120 is constructed. In an embodiment in which the beam 120 is connected to frame 110 by one or more flexures 122, the beam 120 will oscillate at a resonance frequency that is characterized by the geometry of the beam 120 and the physical characteristics of the material from which the beam 120 is constructed and the geometry and materials of the flexures 122.

Oscillation in the beam 120 causes relative motion between probe 124 and the surface 132 of object 130. When the probe 124 is mounted in the center of the beam 120 (or membrane), the motion of the probe 124 is perpendicular to the surface 132. When the probe 124 is mounted off center, then the motion of the tip would be at an angle, which may be of use to measure a side wall of a feature on the surface 132 of object 130.

Motion inducing assembly 150 may further induce lateral motion between the object 130 and the atomic force microscope 100 to permit the microscope 100 to scan the surface of object 130. Motion inducing assembly 150 may move object 130 relative to atomic force microscope 100, or may move atomic force microscope 100 relative to object 130, or both.

Atomic force microscope 100 further comprises a detection assembly 160. In operation, detection assembly 160 detects a characteristic of the beam, membrane, or flexure. A variety of techniques may be used to detect a characteristic of the underlying surface. In some embodiments the detection assembly detects a property related to the position, motion, or deformation of the beam, membrane, or flexure. For example, detection assembly 160 may be embodied as an interferometer assembly, a capacitive sensing assembly, an inductive sensing assembly, a piezoelectric response assembly, or an optical cantilever assembly.

In some embodiments atomic force microscope 100 may comprises a radiation assembly 170. In operation, radiation assembly 170 may be embodied as a scanning assembly which directs radiation onto the surface 132 of object 130, and measures one or more characteristics of surface 132 using radiation induced from surface 132. Various radiation assemblies and techniques for surface inspection are described in U.S. Pat. Nos. 6,665,078, 6,717,671, and 6,757,056, and 6,909,500 to Meeks, et al., the disclosures of which are incorporated herein by reference in their entirety. The radiation assembly can either scan (i.e., like a scanning laser microscope) or flood an area and image it (i.e., as in a conventional microscope). The radiation may be constant or it might be modulated in intensity, wavelength, phase, or polarization. In addition to using the radiation reflected for the surface, transmitted, scattered or diffracted radiation may be used. Additionally, the radiation may be used to modify or modulate the properties of the sample or the beam/membrane.

In some embodiments, at least a portion of beam (or membrane) 120 may be formed from a material that is at least partially transmissive to radiation from radiation assembly 170. In such embodiments, the beam (or membrane) 120 may be a passive element or may be an active element such as, e.g., a lens that focuses radiation onto a point of surface 132 of object 130.

Reference in the specification to "one embodiment" or "an embodiment" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An atomic force microscope, comprising:
    a frame;
    a beam coupled to the frame at a first end and a second end, wherein at least a portion of the beam is constructed from a material that transmits radiation;
    a probe mounted to the beam;
    means for inducing relative motion between the beam and an underlying surface; and
    means for detecting at least one of a motion, position or deformation of the beam;
    means for inferring a property of the sample based at least in part on an interaction of the probe with the surface.

2. The atomic force microscope of claim 1, wherein the means for inducing relative motion between the beam and an underlying surface comprises at least one of:
    a piezoelectric stimulator assembly;
    an acoustic stimulator assembly;
    an ultrasound stimulator assembly;
    an electrostatic assembly;
    a capacitive coupling assembly;
    an optical assembly; or
    a magnetic assembly.

3. The atomic force microscope of claim 1, wherein the means for detecting a characteristic of the beam comprises at least one of:
    an interferometer assembly;
    a capacitive sensing assembly;
    an inductive sensing assembly;
    a piezoelectric response assembly;
    a piezoelectric sensing assembly; or
    an optical cantilever assembly.

4. The atomic force microscope of claim 1, wherein at least a portion of the beam forms an optical element in an optical assembly.

5. The atomic force microscope of claim 1, wherein the beam is mounted to the frame by one or more flexures, and wherein the beam vibrates at a resonant frequency defined by the beam and the one or more flexures.

6. An atomic force microscope, comprising:
    a frame;
    a rigid structure coupled to the frame at a plurality of locations, wherein at least a portion of the rigid structure is constructed from a material that transmits radiation;
    a probe mounted to the rigid structure;
    means for inducing relative motion between the rigid structure and an underlying surface; and
    means for detecting at least one of a motion, position or deformation of the beam;
    means for inferring a property of the sample based at least in part on an interaction of the probe with the surface.

7. The atomic force microscope of claim 6, wherein the means for inducing relative motion between the rigid structure and an underlying surface comprises at least one of:
    a piezoelectric stimulator assembly;
    an acoustic stimulator assembly;
    an ultrasound stimulator assembly;
    an electrostatic assembly;
    a capacitive coupling assembly;
    an optical assembly; or
    a magnetic assembly.

8. The atomic force microscope of claim 6, wherein the means for detecting a characteristic of the rigid structure comprises at least one of:
    an interferometer assembly;
    a capacitive sensing assembly;
    an inductive sensing assembly;
    a piezoelectric response assembly;
    a piezoelectric sensing assembly; or
    an optical cantilever assembly.

9. The atomic force microscope of claim 6, wherein at least a portion of the rigid structure forms an optical element in an optical assembly.

10. The atomic force microscope of claim 6, wherein the rigid structure is mounted to the frame by one or more flexures, and wherein the rigid structure vibrates at a resonant frequency defined by the beam and the one or more flexures.

11. An atomic force microscope, comprising:
    a frame;
    a rigid membrane coupled to the frame at a plurality of locations on a circumference of the membrane, wherein at least a portion of the rigid membrane is constructed from a material that transmits radiation;
    a probe mounted to the rigid membrane;
    an assembly to induce relative motion between the rigid membrane and an underlying surface and to infer a property of the sample based at least in part on an interaction of the probe with the surface.

12. The atomic force microscope of claim 11, wherein at least a portion of the rigid membrane forms an optical element in an optical assembly.

13. The atomic force microscope of claim 11, wherein the rigid membrane is mounted to the frame by one or more flexures, and wherein the rigid membrane vibrates at a resonant frequency defined by the beam and the one or more flexures.

14. The atomic force microscope of claim 11, wherein the assembly to induce relative motion between the rigid membrane and an underlying surface comprises at least one of:

a piezoelectric stimulator assembly;
an acoustic stimulator assembly;
an ultrasound stimulator assembly;
an electrostatic assembly;
a capacitive coupling assembly;
an optical assembly; or
a magnetic assembly.

15. The atomic force microscope of claim 11, wherein the assembly to detect a characteristic of the membrane comprises at least one of:
an interferometer assembly;
a capacitive sensing assembly;
an inductive sensing assembly;
a piezoelectric response assembly;
a piezoelectric sensing assembly; or
an optical cantilever assembly.

16. An atomic force microscope, comprising:
a frame;
a beam coupled to the frame at a first end and a second end wherein the beam is mounted to the frame by one or more flexures, wherein at least a portion of the beam is constructed from a material that transmits radiation, and wherein the beam vibrates at a resonant frequency defined by the beam and the one or more flexures;
a probe mounted to the beam;
means for inducing relative motion between the beam and an underlying surface; and
means for detecting at least one of a motion, position or deformation of the beam;
means for inferring a property of the sample based at least in part on an interaction of the probe with the surface.

17. The atomic force microscope of claim 1, wherein the means for inducing relative motion between the beam and an underlying surface comprises at least one of:
a piezoelectric stimulator assembly;
an acoustic stimulator assembly;
an ultrasound stimulator assembly;
an electrostatic assembly;
a capacitive coupling assembly;
an optical assembly; or
a magnetic assembly.

18. The atomic force microscope of claim 1, wherein the means for detecting a characteristic of the beam comprises at least one of:
an interferometer assembly;
a capacitive sensing assembly;
an inductive sensing assembly;
a piezoelectric response assembly;
a piezoelectric sensing assembly; or
an optical cantilever assembly.

19. The atomic force microscope of claim 1, wherein at least a portion of the beam is constructed from a material that transmits radiation.

20. The atomic force microscope of claim 1, wherein at least a portion of the beam forms an optical element in an optical assembly.

21. An atomic force microscope, comprising:
a frame;
a rigid structure coupled to the frame at a plurality of locations wherein the rigid structure is mounted to the frame by one or more flexures, wherein at least a portion of the rigid structure is constructed from a material that transmits radiation, and wherein the rigid structure vibrates at a resonant frequency defined by the beam and the one or more flexures;
a probe mounted to the rigid structure;
means for inducing relative motion between the rigid structure and an underlying surface; and
means for detecting at least one of a motion, position or deformation of the beam;
means for inferring a property of the sample based at least in part on an interaction of the probe with the surface.

22. The atomic force microscope of claim 6, wherein the means for inducing relative motion between the rigid structure and an underlying surface comprises at least one of:
a piezoelectric stimulator assembly;
an acoustic stimulator assembly;
an ultrasound stimulator assembly;
an electrostatic assembly;
a capacitive coupling assembly;
an optical assembly; or
a magnetic assembly.

23. The atomic force microscope of claim 6, wherein the means for detecting a characteristic of the rigid structure comprises at least one of:
an interferometer assembly;
a capacitive sensing assembly;
an inductive sensing assembly;
a piezoelectric response assembly;
a piezoelectric sensing assembly; or
an optical cantilever assembly.

24. The atomic force microscope of claim 6, wherein at least a portion of the rigid structure is constructed from a material that transmits radiation.

25. The atomic force microscope of claim 6, wherein at least a portion of the rigid structure forms an optical element in an optical assembly.

26. An atomic force microscope, comprising:
a frame;
a rigid membrane coupled to the frame at a plurality of locations on a circumference of the membrane, wherein the rigid membrane is mounted to the frame by one or more flexures, wherein at least a portion of the rigid membrane is constructed from a material that transmits radiation, and wherein the rigid membrane vibrates at a resonant frequency defined by the beam and the one or more flexures;
a probe mounted to the rigid membrane;
an assembly to induce relative motion between the rigid membrane and an underlying surface and to infer a property of the sample based at least in part on an interaction of the probe with the surface.

27. The atomic force microscope of claim 11, wherein at least a portion of the rigid membrane is constructed from a material that transmits radiation.

28. The atomic force microscope of claim 11, wherein at least a portion of the rigid membrane forms an optical element in an optical assembly.

29. The atomic force microscope of claim 11, wherein the assembly to induce relative motion between the rigid membrane and an underlying surface comprises at least one of:
a piezoelectric stimulator assembly;
an acoustic stimulator assembly;
an ultrasound stimulator assembly;
an electrostatic assembly;
a capacitive coupling assembly;
an optical assembly; or
a magnetic assembly.

30. The atomic force microscope of claim 11, wherein the assembly to detect a characteristic of the membrane comprises at least one of:
an interferometer assembly;
a capacitive sensing assembly;
an inductive sensing assembly;
a piezoelectric response assembly;
a piezoelectric sensing assembly; or
an optical cantilever assembly.

* * * * *